Oct. 14, 1930.                    D. FRY                    1,778,383
BATTERY FILLER
Filed May 18, 1928
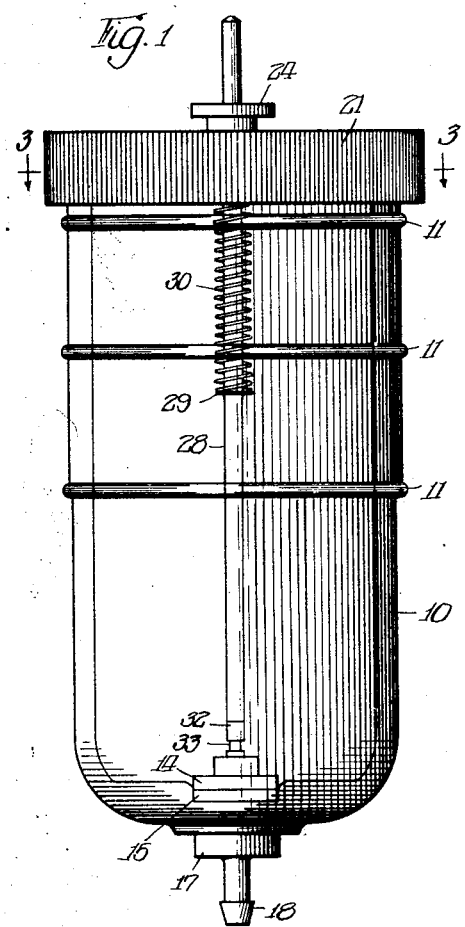
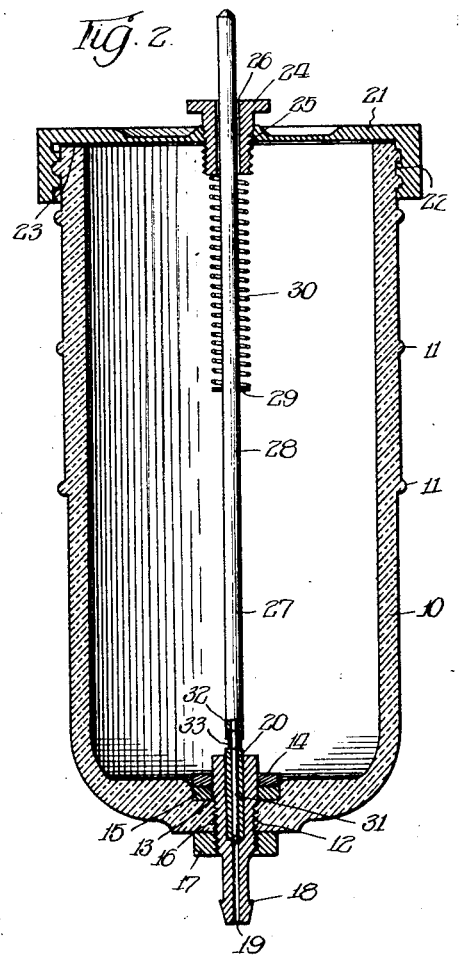
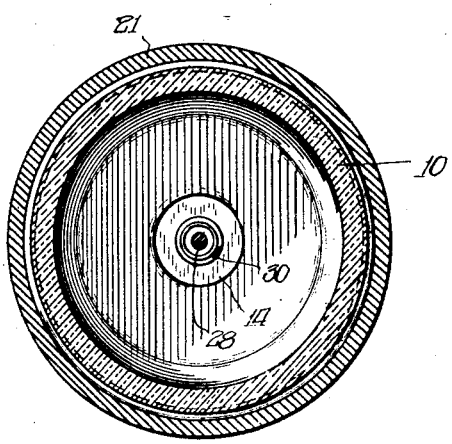
Inventor:
Dalph Fry, Patented Oct. 14, 1930

1,778,383

UNITED STATES PATENT OFFICE

DALPH FRY, OF ROCHESTER, PENNSYLVANIA, ASSIGNOR TO FRY EQUIPMENT CORPORATION, OF ROCHESTER, PENNSYLVANIA, A CORPORATION OF DELAWARE

BATTERY FILLER

Application filed May 18, 1928. Serial No. 278,666.

This invention pertains to battery supply devices, and more particularly to devices for automatically dispensing fluid to storage batteries so that there will be a substantially constant supply to the control valve for the cells of said batteries.

It is usual in vehicles, or as a matter of fact any source of energy, as an engine, motor, etc., employing storage batteries as current supply, to experience great difficulty, especially in warm weather, in keeping the fluid at the correct level in the cells of the battery. If excess fluid is supplied to the cells, corrosion takes place around the top of the battery as a portion of the fluid leaks through the air vent in the battery cap, causing electrolytic action to take place between adjacent metal parts, such as the steel battery supports or cover. If too little fluid is supplied to the cells, there is danger of exhausting the battery, entailing charging and other costs, which are expensive. Then, too, oftentimes there may be a small leak in one of the cells of the battery which will gradually empty the cell, causing damage to the plates, with the result that new plates must be supplied and the battery must be recharged.

It is therefore an object of this invention to provide a novel, inexpensive, simple and positive device for keeping the cells of a storage battery supplied with the proper amount of fluid at all times.

Another object is to provide a device for a vehicle to supply fluid to the batteries, which device is particularly actuated when the vehicle is in motion.

Still another object is to provide a device actuated by the motion of a vehicle or by artificial motion to supply fluid to the batteries, the parts of the device being so arranged that the cells of the batteries will be resupplied automatically when the fluid in said cells has fallen below a predetermined level.

Yet another object is to provide a device for supplying fluid to various means, said device being either manually or automatically operated.

A further object is to provide a device insuring adequate fluid supply to battery cells even though there may be a small leak in said cells or regardless of the period of vibrations of the device.

A still further object is to provide an inexpensive and effective fluid reservoir for automatically dispensing fluid therefrom and one which fulfills all requirements of manufacture and service.

With these and various other objects in view, the invention may consist of certain novel features of construction and operation as will be more fully described and particularly pointed out in the specifications, drawings and claim appended hereto.

In the drawings, which illustrate an embodiment of the device and wherein like reference characters are used to designate parts—

Figure 1 is a side elevation of a container embodying the invention;

Figure 2 is a sectional elevation of the device illustrated in Figure 1; and

Figure 3 is a top plan view of the device, the same being taken substantially in the plane as indicated by the line 3—3 of Figure 1.

In the assembly of the device, it has been found desirable to provide a container 10 of pyrex or other material which is preferably transparent and substantially unbreakable, with spaced ribs 11 so disposed as to form positioning means for a suitable band or support (not shown) for the assembly.

The container is preferably closed at the bottom and provided with an aperture 12 through which seat member 13 is adapted to extend, said seat member being preferably provided with a shouldered portion 14 spaced from the container by means of the washer 15. Member 13 is threaded as at 16, and is adapted for engagement with the nut 17 disposed on the outside of the container and being adapted to draw the shouldered portion 14 into tight engagement with the washer 15 to thereby prevent any leakage of the fluid around the seat member. The end of the seat member is provided with a shoulder or enlargement 18 for the reception of a discharge hose leading to the valves of the battery cells, all as particularly described in application Serial No. 201,840, filed June 27, 1927, though it is to be understood that any other form of valves may be used. The seat member 13 is provided with a channel 19 extending therethrough, said channel adjacent the upper end being provided with a bushing 20 providing a valve seat for the valve member to be later described.

The container is provided with a top 21 provided with a threaded or bayonet socket connection 22 therebetween, a washer 23 being interposed between the top and the container to prevent any leakage therefrom. The top is provided with a vertically adjusted thimble 24 disposed above the member 13, the same having threaded connection with the top as at 25, said thimble being provided with the channel 26 extending therethrough. Valve member 27 is disposed between the valve seat 13 and top 21 and extends upwardly through aperture 26, said member consisting essentially of a stem or inertia member 28, said stem being preferably of a smaller diameter than the diameter of the channel 26 and being provided with a support 29, between which and the thimble 24 there is disposed an expansion spring 30 normally urging the valve member 27 toward the valve seat 13. The thimble 24 serves as a guide for the stem 28 and also as a seat for the spring 30. The valve stem 28 is provided with a depending needle valve 31 extending into the bushing 20 and preferably of slightly smaller diameter than said bushing, there being provided interfitting collar members 32 and 33 on member 27 between the valve stem 28 and the bushing 20 of any suitable material as will prevent passage of fluid through the bushing when the member 33 is in contact with said bushing.

In operation of the device, it will be appreciated that moving the thimble 24 upwardly or downwardly imposes a less or greater downward pressure on the valve member through the spring 30, thereby varying the seating capacity of said valve. Different vibrations of the container, depending upon the device upon which it is mounted, will cause relative movement of the valve member with respect to the valve seat and bushing, the same being limited by the spring 30, such movement causing unseating of the member 33 and permitting amounts of fluid to flow past the valve seat, through the passage 19 into the connected tube to the battery cells to thereby replenish the same with said fluid. Should it be desired to operate the device without imparting vibrations thereto, it is only necessary to manually lift the valve stem 28 by moving the upper part thereof to cause unseating of the valve, whereupon any amount of fluid may be allowed to be supplied to the batteries to be filled or replenished.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claim.

I claim:

In a battery filling or the like device, the combination of a fluid container, a closure removably carried thereby, said container having an opening therein provided with a valve seat, a valve member for said seat provided with a guide cooperating with said seat, said guide extending therein and disposed and proportioned to permit flow past said guide and directly past said seat when the valve is unseated, said valve having a rigid stem provided with a supporting member, an adjustable guide for said stem carried by said closure and through which said stem extends outwardly of said container, and resilient means disposed between said supporting member and said last named guide and surrounding said stem for adjustably controlling the operation of said valve.

Signed at Rochester, Pennsylvania, this 14th day of May, 1928.

DALPH FRY.